(12) United States Patent
Nose

(10) Patent No.: US 9,817,706 B2
(45) Date of Patent: Nov. 14, 2017

(54) NON-TRANSITORY COMPUTER-READABLE RECORDING MEDIUM HAVING STORED THEREIN A COMMUNICATION ALGORITHM DETERMINATION PROGRAM, COMMUNICATION ALGORITHM DETERMINATION METHOD, AND INFORMATION PROCESSING DEVICE EXECUTING A COMMUNICATION ALGORITHM DETERMINATION PROGRAM

(71) Applicant: FUJITSU LIMITED, Kawasaki-shi, Kanagawa (JP)

(72) Inventor: Takafumi Nose, Odawara (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/264,696

(22) Filed: Sep. 14, 2016

(65) Prior Publication Data
US 2017/0153931 A1  Jun. 1, 2017

(30) Foreign Application Priority Data
Nov. 30, 2015  (JP) .................................. 2015-232760

(51) Int. Cl.
*G06F 9/54* (2006.01)
*G06F 13/42* (2006.01)

(52) U.S. Cl.
CPC .......... *G06F 9/546* (2013.01); *G06F 13/4221* (2013.01)

(58) Field of Classification Search
CPC ................. G06F 9/546; H04L 29/06
(Continued)

(56) References Cited

U.S. PATENT DOCUMENTS 6,751,791 B2* 6/2004 Inaba ................. G06F 8/437
                                                          717/154
7,257,122 B1   8/2007 Keturi
(Continued)

FOREIGN PATENT DOCUMENTS

JP   2001-519982   10/2001
JP   2009-193430   8/2009
(Continued)

OTHER PUBLICATIONS

Jelena Pjesivac-Grbovic et al.; "MPI Collective Algorithm Selection and Quadtree Encoding" (2006), pp. 1-7 (7 pages).

*Primary Examiner* — Andy Ho
(74) *Attorney, Agent, or Firm* — Fujitsu Patent Center

(57) ABSTRACT

An information processing device in a parallel computer system, the information processing device includes a processor. The process is configured to execute a process including performing first communication having a message length within a specific range according to communication algorithms different from each other, and measuring communication speeds according to the respective communication algorithms, determining a procedure of the communication algorithms in performing second communication on the basis of the measured communication speeds, the second communication having a message length within a range of the message length that is longer than the message length of the first communication, performing the second communication according to the determined procedure, and measuring the communication speeds according to the respective communication algorithms, and determining the communication algorithm according to the message length on the basis of measurement results in the first communication and the measurement results in the second communication.

8 Claims, 12 Drawing Sheets

(58) Field of Classification Search
USPC .................................................. 719/310, 313
See application file for complete search history.

(56) References Cited

U.S. PATENT DOCUMENTS

| | | | |
|---|---|---|---|
| 9,448,863 B2* | 9/2016 | Supalov | G06F 9/5066 |
| 2003/0139143 A1* | 7/2003 | Obata | H04W 28/18 455/68 |
| 2009/0210586 A1 | 8/2009 | Tanabe | |
| 2012/0110192 A1 | 5/2012 | Lu et al. | |
| 2012/0317312 A1 | 12/2012 | Elko et al. | |
| 2016/0143082 A1* | 5/2016 | Iwakura | H04W 24/02 370/328 |
| 2016/0314073 A1* | 10/2016 | Dinan | G06F 12/109 |

FOREIGN PATENT DOCUMENTS

| | | |
|---|---|---|
| JP | 2013-529336 | 7/2013 |
| JP | 2014-520321 | 8/2014 |
| WO | 98/47270 | 10/1998 |
| WO | 2011/137175 | 11/2011 |
| WO | 2012/168866 | 12/2012 |

\* cited by examiner

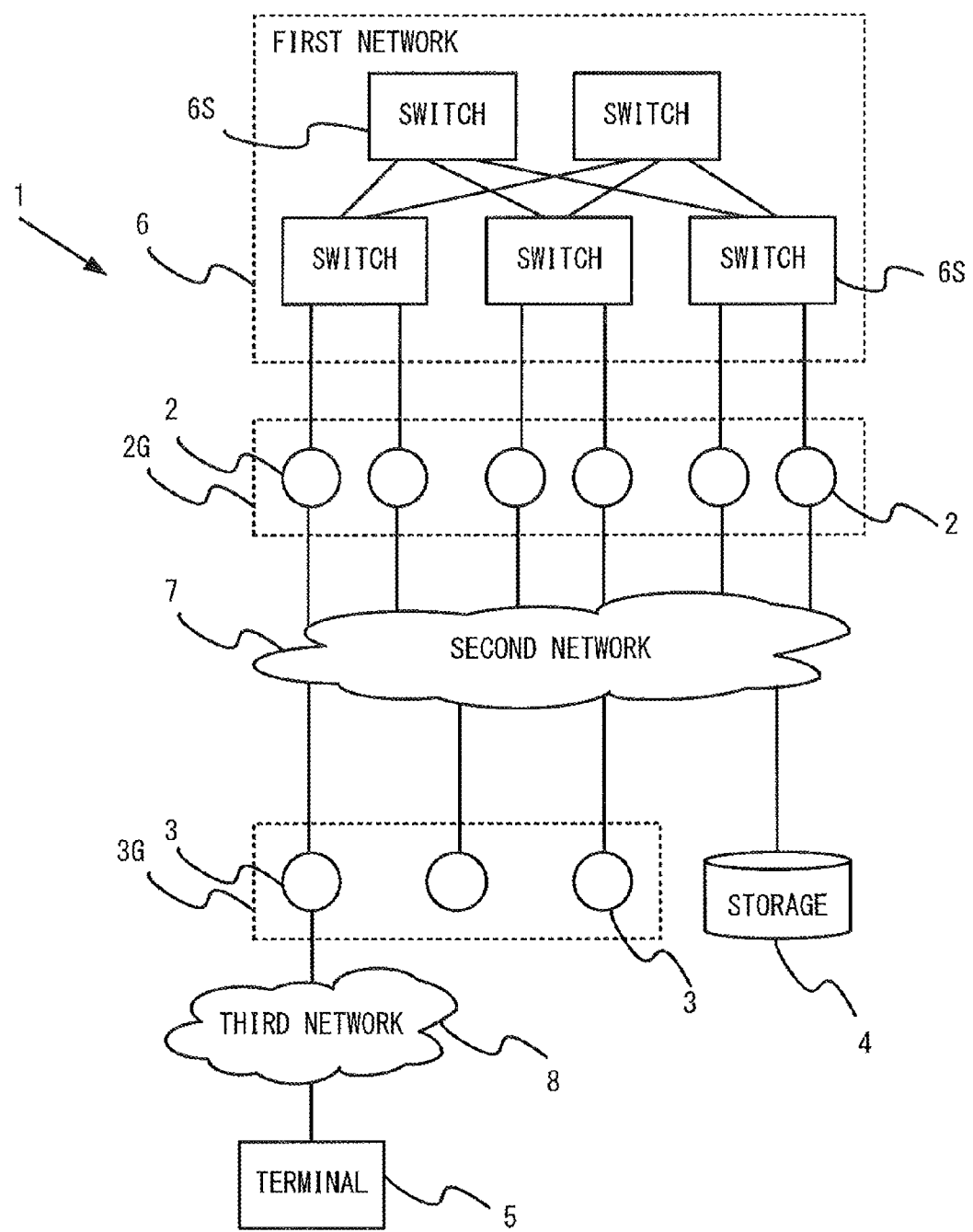
F I G. 1

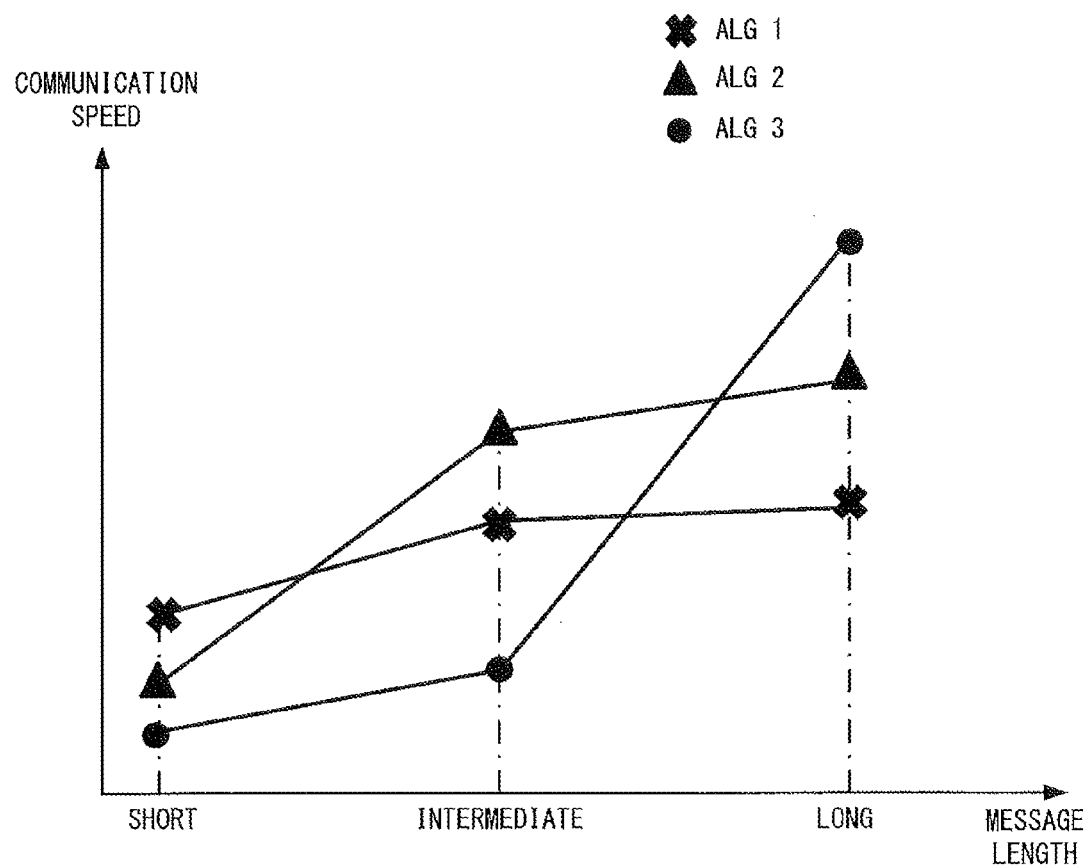
F I G. 3

| NUMBER OF NODES | MESSAGE LENGTH | COMMUNICATION ALGORITHM |
|---|---|---|
| 128 | 0 | None |
| 128 | 4 | Ring |
| 128 | 1024 | Basic linear |
| 128 | 4096 | 3D Multiring |

FIG. 6

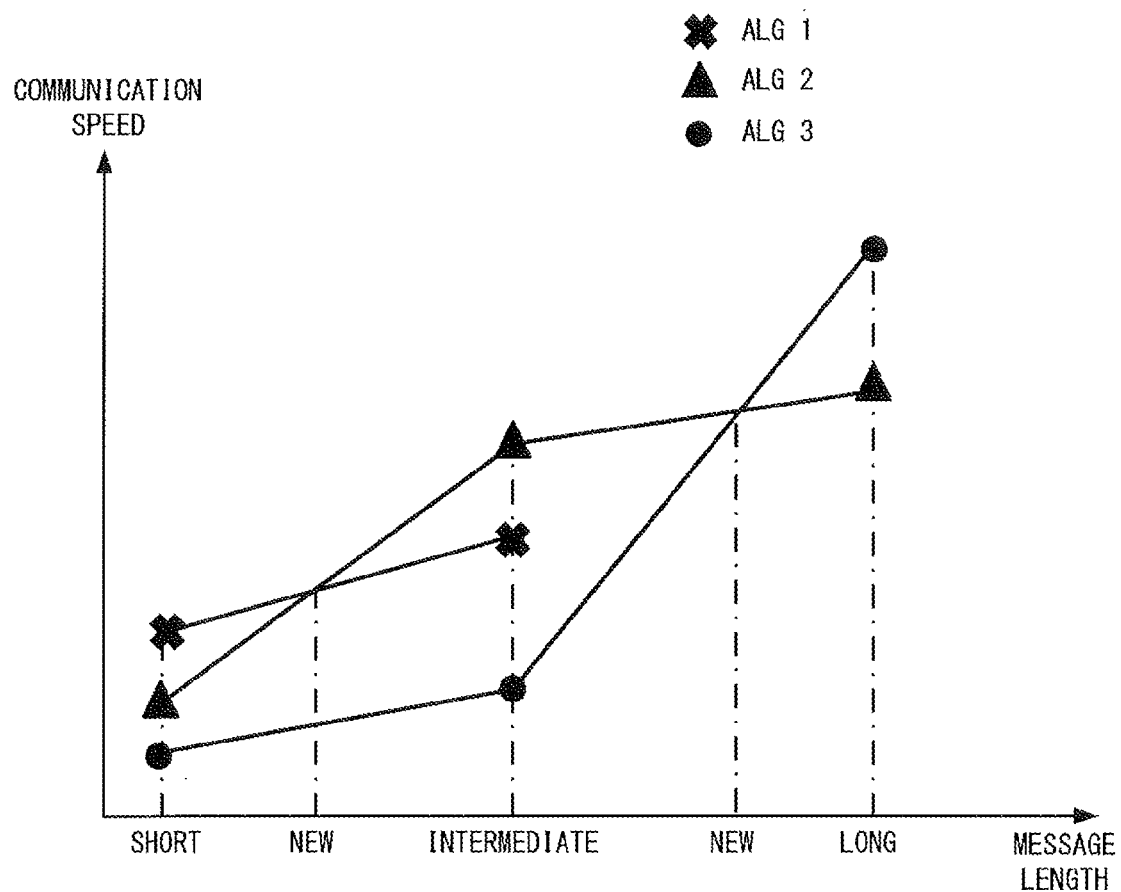
F I G. 7

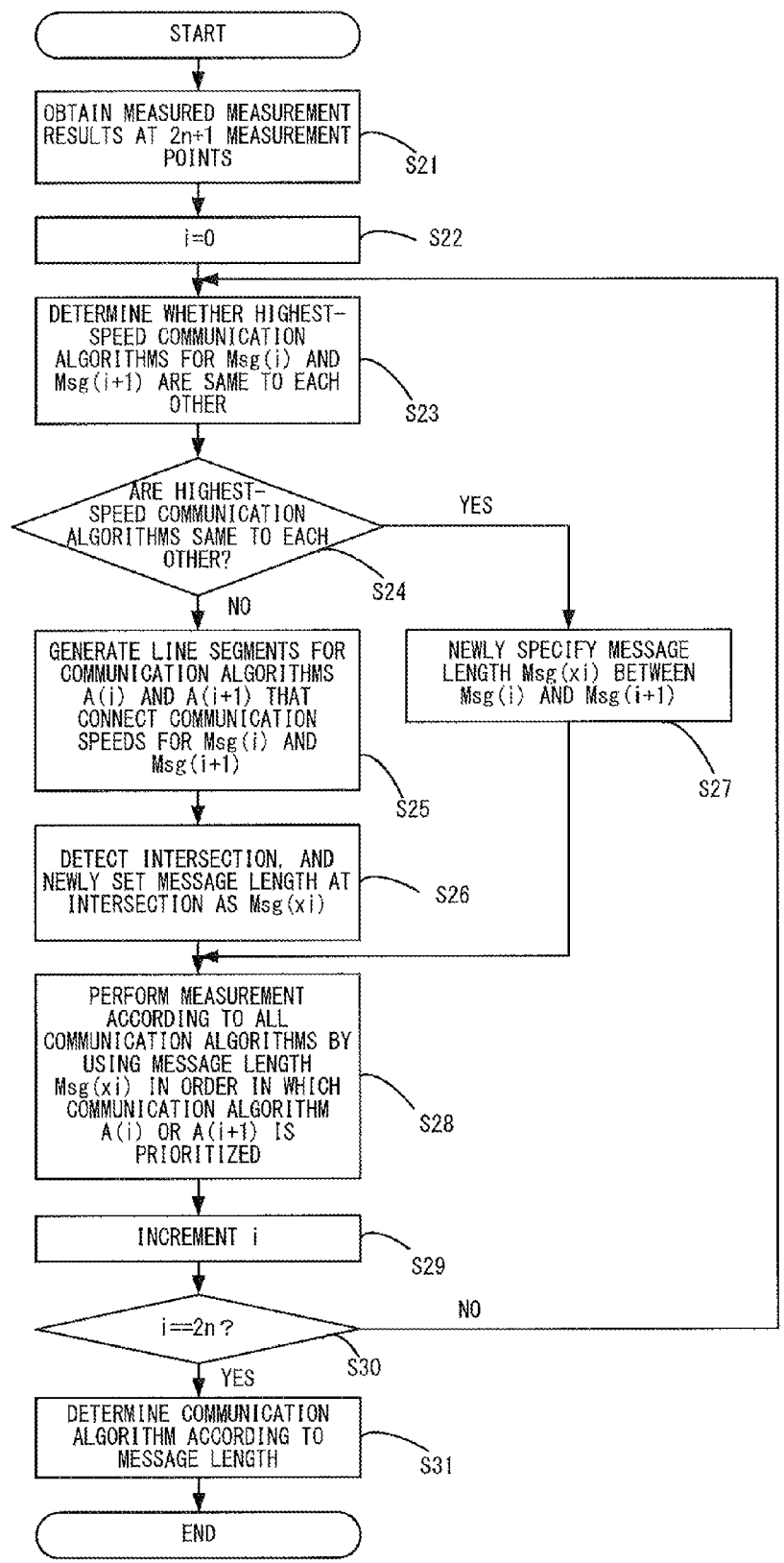
F I G. 11

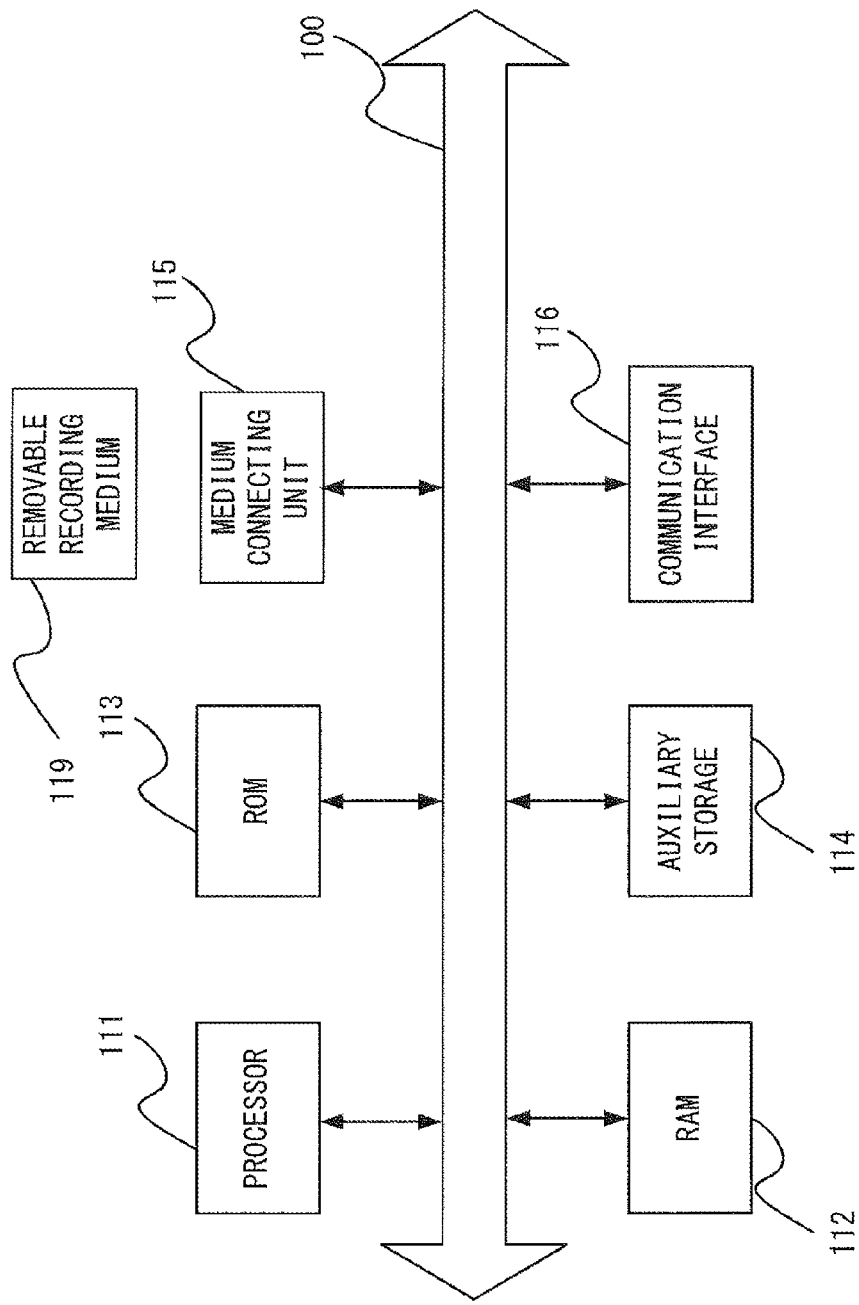

NON-TRANSITORY COMPUTER-READABLE RECORDING MEDIUM HAVING STORED THEREIN A COMMUNICATION ALGORITHM DETERMINATION PROGRAM, COMMUNICATION ALGORITHM DETERMINATION METHOD, AND INFORMATION PROCESSING DEVICE EXECUTING A COMMUNICATION ALGORITHM DETERMINATION PROGRAM

CROSS-REFERENCE TO RELATED APPLICATION

This application is based upon and claims the benefit of priority of the prior Japanese Patent Application No. 2015-232760, filed on Nov. 30, 2015, the entire contents of which are incorporated herein by reference.

FIELD

The embodiments discussed herein are related to a non-transitory computer-readable recording medium, a communication algorithm determination method, and an information processing device.

BACKGROUND

Examples of a standard for performing group communication in a parallel computer system such as high-performance computing include MPI (Message Passing Interface). A plurality of communication algorithms are applied to group communication.

As a related technology, technologies disclosed in Patent Documents 1 to 4 have been proposed. As an example, a technology has been proposed for providing a mobile subscriber with at least some services in a wide-Internet type telecommunication network that uses a large number of protocols.

In addition, a technology has been proposed for remarkably reducing the time needed to search for received information relating to a reception key that matches a reception key specified according to a reception function of MPI, compared with conventional technologies.

Further, a technology has been proposed for providing a facility that enables operator message commands from individual sources to be provided to a connection facility in a computing environment in order to process the operator message commands.

Furthermore, a technology has been proposed for using a light-weight protocol (LWP) and a protocol agent in a network communication system.

[Patent Document 1] Japanese National Publication of International Patent Application No. 2001-519982

[Patent Document 2] Japanese Laid-open Patent Publication No. 2009-193430

[Patent Document 3] Japanese National Publication of International Patent Application No. 2014-520321

[Patent Document 4] Japanese National Publication of International Patent Application No. 2013-529336

SUMMARY

According to an aspect of the embodiments, a non-transitory computer-readable recording medium having stored therein a communication algorithm determination program performed by a processor that causes a node in a parallel computer system to execute a process, the process includes performing first communication having a message length within a specific range according to communication algorithms different from each other, and measuring communication speeds according to the respective communication algorithms, determining a procedure of the communication algorithms in performing second communication on the basis of the measured communication speeds, the second communication having a message length within a range of the message length that is longer than the message length of the first communication, performing the second communication according to the determined procedure, and measuring the communication speeds according to the respective communication algorithms and determining the communication algorithm according to the message length on the basis of measurement results in the first communication and the measurement results in the second communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a parallel computer system.

FIG. 3 is a graph (no. 1) illustrating an example of communication algorithm determination.

FIG. 6 illustrates an example of a table indicating communication algorithms according to message lengths.

FIG. 7 is a graph (no. 4) illustrating an example of communication algorithm determination.

FIG. 11 is a flowchart (no. 3) illustrating an example of processing according to the embodiments.

FIG. 12 illustrates an example of a hardware configuration of a computing node.

DESCRIPTION OF EMBODIMENTS

Figure 2:
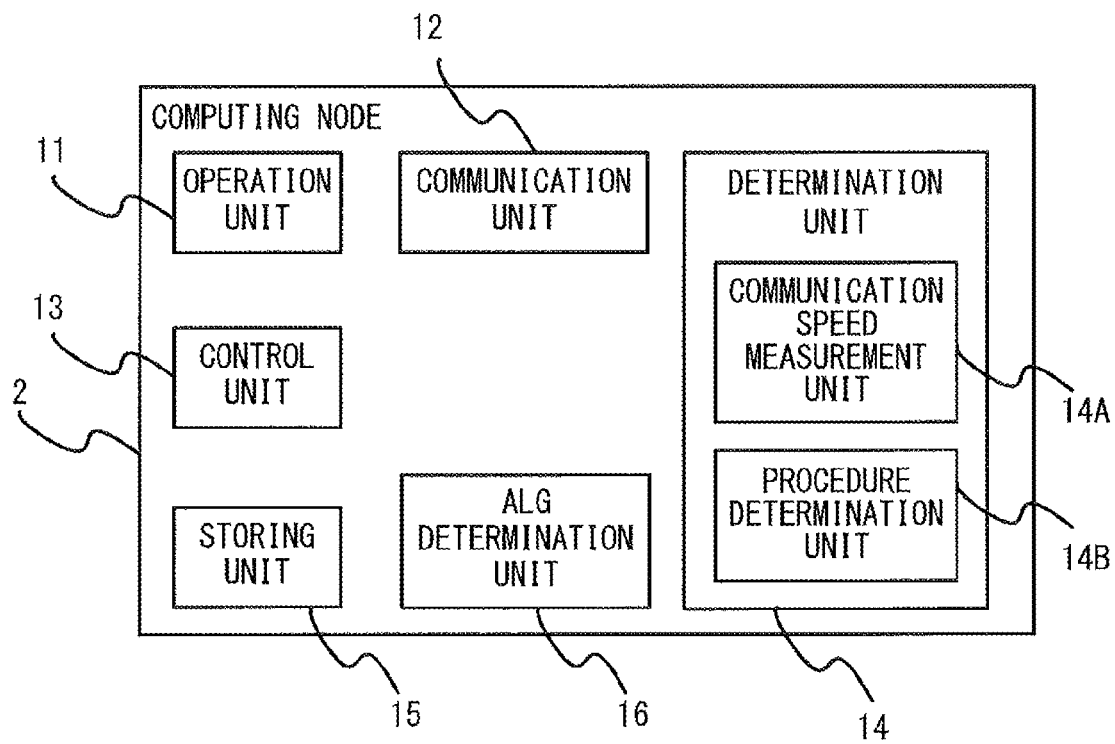
FIG. 2 illustrates an example of a computing node.

Each of the communication algorithms applied to group communication changes in communication performance in accordance with a message length of a communicated message. As an example, a communication algorithm may have a high communication performance for a short message length, but may have a relatively low communication performance for a long message length.

Another communication algorithm may have a high communication performance for a long message length, but may have a relatively low communication performance for a short message length. Accordingly, it is preferable that an appropriate communication algorithm according to a message length be determined early.

<Example of Parallel Computer System According to Embodiments>

Embodiments are described below with reference to the drawings. FIG. 1 illustrates an example of a parallel computer system 1 according to the embodiments. The parallel computer system 1 includes a plurality of computing nodes 2, a plurality of control nodes 3, a storage 4, and a terminal 5. The parallel computer system 1 also includes a first network 6, a second network 7, and a third network 8.

Each of the plurality of computing nodes 2 includes a processor and a main storage, and performs a prescribed process. The computing node 2 is an example of a node or an information processing device. Assume that a group including the plurality of computing nodes 2 is a computing node group 2G.

The plurality of computing nodes 2 use a communication function referred to as group communication so as to communicate with each other, and to perform parallel processing. MPI may be applied to a library of group communication. Note that the library of group communication is not limited to MPI.

The control node 3 is a computer that performs various types of control on the parallel computer system 1. Assume that a group including the plurality of control nodes 3 is a control node group 3G. One control node 3 may be included in the parallel computer system 1.

The storage 4 is a storage that stores information. FIG. 1 illustrates an example in which one storage 4 is shared by the plurality of computing nodes 2 and the plurality of control nodes 3. The parallel computer system 1 may include a plurality of storages 4, and one storage 4 may be allocated to one computing node 2.

The terminal 5 transmits various types of information to the control nodes 3. The terminal 5 is operated by an operator of the terminal 5, and the terminal 5 receives an operation of the operator, and transmits various types of information to the control nodes 3.

The first network 6 is connected to the respective computing nodes 2, and the respective computing nodes 2 perform group communication via the first network 6. The first network 6 includes a plurality of switches 6S. The switches 6S may be, for example, routers. FIG. 1 illustrates an example in which the first network 6 has a Fat-Tree topology. Note that the topology of the first network 6 is not limited to the Fat-Tree topology.

The second network 7 is a network that connects the respective computing nodes 2 to the respective control nodes 3 and the storage 4. The third network 8 is a network that connects the control nodes 3 to the terminal 5.

The respective computing nodes 2 may be connected to each other via a network of another system in addition to the first network 6. The network of another system may be, for example, a network used to perform barrier synchronization, a contraction operation, or the like.

<Example of Computing Node>

An example of the computing node 2 is described next with reference to FIG. 2. The computing node 2 includes an operation unit 11, a communication unit 12, a control unit 13, a measurement unit 14, a storing unit 15, and an algorithm determination unit 16. In FIG. 2, the algorithm determination unit 16 is expressed as an "ALG determination unit".

The operation unit 11 performs a prescribed operation. The communication unit 12 communicates with other computing nodes 2 via the first network 6. The control unit 13 performs various types of control relating to processing according to the embodiments performed by the computing nodes 2.

The measurement unit 14 includes a communication speed measurement unit 14A and a procedure determination unit 14B. The communication speed measurement unit 14A measures the communication performance of communication algorithms. As a measured communication speed becomes higher, the communication performance increases, and as the measured communication speed becomes lower, the communication performance decreases.

The procedure determination unit 14B determines a procedure for measuring the communication performance of a communication algorithm. In the embodiments, a plurality of communication algorithms are applied to group communication. The procedure determination unit 14B determines a procedure for (the order of) performing measurement according to the plurality of communication algorithms. The communication speed measurement unit 14A measures the communication speeds of the communication algorithms in accordance with the procedure determined by the procedure determination unit 14B.

The storing unit 15 stores various types of information. As an example, the storing unit 15 stores the communication speeds (measurement results) measured by the communication speed measurement unit 14A. The algorithm determination unit 16 determines a communication algorithm to be used from among the plurality of communication algorithms used to perform group communication in accordance with a message length (the size of a message).

In the embodiments, the algorithm determination unit 16 determines the highest-speed communication algorithm for each of the message lengths to be an appropriate communication algorithm.

<Example of Communication Algorithm Determination>

An example of communication algorithm determination is described below with reference to FIGS. 3 to 7. FIGS. 3 to 7 illustrate examples of a graph illustrating a relationship between a message length and a communication speed. In the respective drawings, three marks (a cross, a triangle, and a circle) respectively express different types of communication algorithms.

In the example of FIG. 3, a cross expresses a communication algorithm ALG1, a triangle expresses a communication algorithm ALG2, and a circle expresses a communication algorithm ALG3. The number of types of communication algorithms is not limited to three.

The example of FIG. 3 illustrates communication speeds of the respective communication algorithms in the cases of a short message length, an almost intermediate message length, and a long message length. In group communication using the short message length, communication according to the communication algorithm ALG1 is performed at the highest speed.

In group communication using the almost intermediate message length, communication according to the communication algorithm ALG2 is performed at the highest speed. In group communication using the long message length, communication according to the communication algorithm ALG3 is performed at the highest speed. A communication algorithm according to which communication is performed at the highest speed is a communication algorithm having the most satisfactory communication performance.

The short message length may have a size that is smaller than the size of a packet transmitted by the computing node 2, or a size that is almost the same as an immediate embedded into an instruction issued to hardware.

The long message length may have a size that is almost the same as a maximum value of a transfer length that can be instructed to the switch 6S at a time, or a size at which many communication algorithms are estimated to be saturated in communication performance.

The almost intermediate message length (hereinafter referred to as an intermediate message length) may have a size that is almost intermediate between the short message length and the long message length.

The intermediate message length is an example of a message length within a specific range. The message length within the specific range may include the short message length in addition to the intermediate message length. The long message length is within a range of a message length that is longer than the intermediate message length.

Test communication (group communication) according to a communication algorithm using the message length within the specific range is an example of a first communication. Stated another way, test communication according to a communication algorithm using the intermediate message length and the short message length is an example of the first communication. In addition, test communication (group communication) according to a communication algorithm using the long message length is an example of a second communication.

Figure 4:
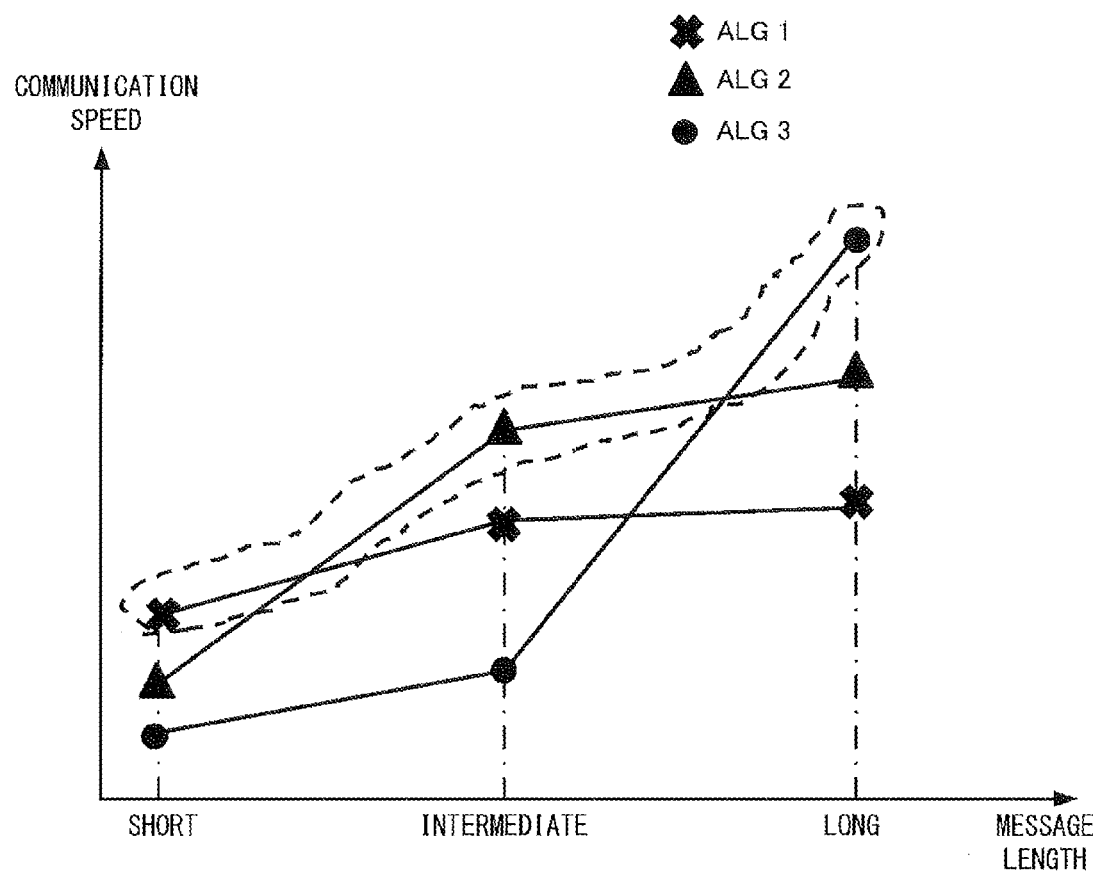
FIG. 4 is a graph (no. 2) illustrating an example of communication algorithm determination.

As illustrated in the example of FIG. 4, communication according to the communication algorithm ALG1 is performed at the highest speed in the case of the short message length, communication according to the communication algorithm ALG2 is performed at the highest speed in the case of the intermediate message length, and communication according to the communication algorithm ALG3 is performed at the highest speed in the case of the long message length.

Accordingly, the algorithm determination unit 16 performs determination in such a way that the communication algorithm ALG1 is applied in the case of the short message length, that the communication algorithm ALG2 is applied in the case of the intermediate message length, and that the communication algorithm ALG3 is applied in the case of the long message length.

Consequently, group communication is performed by using an appropriate communication algorithm according to a message length. In FIG. 4, communication algorithms that are estimated to have the most satisfactory communication performance when the respective message lengths are used are surrounded with a broken line. By applying communication algorithms in an area surrounded with a broken line in FIG. 4 in accordance with a message length in group communication, group communication is performed by using an appropriate communication algorithm according to a message length.

The measurement unit 14 measures the communication performance of each of the communication algorithms according to a message length based on the control of the control unit 13. As an example, the terminal 5 transmits an instruction to execute a communication algorithm determination program for performing processing according to the embodiments, to the control node 3 via the third network 8. Hereinafter, the control node 3 above is referred to as a job control node 3.

Assume that the communication algorithm determination program for performing processing according to the embodiments has been stored in the storage 4. The job control node 3 obtains the communication algorithm determination program from the storage 4 in accordance with the instruction above, and transmits the obtained communication algorithm determination program to the respective computing nodes 2.

The respective computing nodes 2 execute the received communication algorithm determination program. Consequently, the respective computing nodes 2 perform the processing according to the embodiments.

A process performed by one of the computing nodes 2 is a master process, and a process performed by another computing node 2 is a worker process. The worker process is operated in the computing node 2 under the control of the master process.

Information relating to a plurality of communication algorithms is also stored in the storage 4. The respective computing nodes 2 obtain the information relating to the plurality of communication algorithms from the storage 4, and stores the obtained information relating to the plurality of communication algorithms.

The terminal 5 also transmits, to the job control node 3, information relating to three message lengths, the short message length, the intermediate message length, and the long message length, that are targets to be measured (hereinafter referred to as message length information). As an example, an operator that operates the terminal 5 inputs the message length information to the terminal 5.

The terminal 5 may receive the input message length information, and may transmit the received message length information to the job control node 3. The job control node 3 transmits three pieces of message length information that have been received to each of the computing nodes 2. Each of the computing nodes 2 stores the received pieces of message length information, for example, in the main storage.

The control unit 13 of the computing node 2 in which the maser process is operated (hereinafter referred to as a master node) performs test communication according to each of the communication algorithms by using the short message length and the intermediate message length.

The control unit 13 of the master node controls the communication unit 12 so as to report to the computing node 2 in which the worker process is operated (hereinafter referred to as a worker node) that test communication (group communication) has been performed.

This report includes information relating to a communication algorithm for which a communication speed in test communication is measured. The master node may broadcast the report to a plurality of worker nodes.

By doing this, test communication (group communication) that the master node and the plurality of worker nodes participate in is performed. The control unit 13 of the master node controls the communication unit 12 so as to perform test communication according to all of the communication algorithms using the short message length.

In the example of FIG. 4, the communication speed measurement unit 14A of the master node measures communication speeds in test communication (short message length communication) according to three communication algorithms, and stores measurement results in the storing unit 15. As illustrated in the example of FIG. 4, when the short message length is used, communication according to the communication algorithm ALG1 is performed at the highest speed.

The algorithm determination unit 16 performs determination in such a way that the communication algorithm ALG1 is applied to group communication using the short message length.

The communication speed measurement unit 14A of the master node measures communication speeds in test communication according to all of the communication algorithms using the intermediate message length (intermediate message length communication), and stores measurement results in the storing unit 15.

In the example of FIG. 4, when the intermediate message length is used, a communication speed according to the communication algorithm ALG2 is the highest. The algorithm determination unit 16 performs determination in such a way that the communication algorithm ALG2 is applied to group communication using the intermediate message length.

Accordingly, communication speeds are measured according to the respective communication algorithms using the short message length and the intermediate message length. The measurement of the communication speeds according to the respective communication algorithms using the short message length and the intermediate message length may be performed according to an arbitrary procedure.

In the embodiments, a procedure for (the order of) measuring communication speeds by using the short message length or the intermediate message length is different from a procedure for measuring communication speeds by using the long message length. The procedure for measuring communication speeds by using the long message length is described below.

The procedure for measuring communication speeds by using the long message length is determined by the procedure determination unit 14B on the basis of results of measuring a communication speed by using the intermediate message length. The procedure determination unit 14B determines a measurement procedure according to the respective communication algorithms in the case of the long message length in accordance with (1) and (2) below.

(1) A communication speed is measured first according to a communication algorithm according to which a communication speed is the highest when the intermediate message length is used.

(2) With respect to respective communication algorithms according to which a communication speed is not the highest when the intermediate message length is used, a communication speed is measured in order from a communication algorithm having the highest increasing rate (the steepest inclination) of a communication speed around the intermediate message length.

(1) is described below. A communication algorithm according to which a communication speed is the highest when the intermediate message length is used is a communication algorithm that is appropriate to the intermediate message length, and it is considered that a communication speed is saturated when the intermediate message length is used, and that the communication speed is not so high when the long message length is used.

Therefore, the control unit 13 determines whether measurement according to other communication algorithms will be interrupted by using, as a reference, the time needed to measure a communication speed in the case of the long message length according to a communication algorithm according to which a communication speed is the highest when the intermediate message length is used.

Accordingly, the communication speed measurement unit 14A first measures a communication speed according to the communication algorithm according to which a communication speed is the highest when the intermediate message length is used. The control unit 13 measures the time from the start to the end of measurement performed by the communication speed measurement unit 14A. The measured time is the time needed to measure a communication speed according to the communication algorithm according to which a communication speed is the highest when the intermediate message length is used.

Assume that the measurement time above is a time threshold Tth. It is considered that a communication algorithm for which a measurement time exceeds the time threshold Tth is not a communication algorithm according to which a communication speed is not the highest when the long message length is used.

Accordingly, in the embodiments, the control unit 13 monitors the time that the communication speed measurement unit 14A needs to measure a communication speed according to each of the communication algorithms. The control unit 13 performs control to interrupt measurement of a communication speed when the measurement time exceeds the time threshold Tth. As an example, the control unit 13 issues an instruction to interrupt measurement to the communication unit 12 and the measurement unit 14.

Consequently, measurement according to a communication algorithm for which it is considered that a communication speed is not the highest when the long message length is used is interrupted, and the measurement is terminated. Accordingly, the time needed to measure a communication speed when the long message length is used can be reduced.

The time to measure communication speeds when the long message length is used is reduced, and therefore a communication algorithm that is applied to the long message length is determined fast. As an example, in the example of FIG. 5, the time needed to measure a communication speed according to the communication algorithm ALG2 according to which a communication speed is the highest when the intermediate message length is used is the time threshold Tth.

A communication speed according to the communication algorithm ALG1 is slower than the communication speed according to the communication algorithm ALG2 when the long message length is used. Therefore, a measurement time according to the communication algorithm ALG1 is longer than the time threshold Tth.

Accordingly, the control unit 13 performs control to interrupt measurement according to the communication algorithm ALG1 when the long message length is used. Consequently, a measurement time according to the communication algorithm ALG1 when the long message length is used is reduced.

Among communication algorithms, a communication algorithm may exist that has a low increasing rate of a communication speed around the intermediate message length and that has a low communication speed at the long message length.

Even when the communication algorithm above exists, the control unit 13 interrupts measurement of a communication speed performed by the communication speed measurement unit 14A at a point in time at which a measurement time when the long message length is used exceeds the time threshold Tth, and therefore the measurement time can be reduced.

(2) above is described next. The procedure determination unit 14B determines a measurement procedure for each of the communication algorithms other than the communication algorithm for which a communication speed has been measured in (1), on the basis of an increasing rate (an inclination) of a communication speed around the intermediate message length. Specifically, the procedure determination unit 14B determines a measurement procedure in such a way that measurement is performed in order from a communication algorithm having a low increasing rate of a communication speed.

As described above, the intermediate message length is a message length within a specific range. The increasing rate of the communication speed may be obtained on the basis of a communication speed for the intermediate message length and a communication speed for a message length around the intermediate message length.

In the embodiments, assume that the increasing rate of the communication speed is obtained on the basis of a communication speed for the short message length and a communication speed for the intermediate message length. The procedure determination unit 14B determines a measurement procedure in such a way that measurement is performed on respective communication algorithms other than the communication algorithms for which a communication speed has been measured in (1) in order from a communication algorithm having a low increasing rate of the communication speed that has been obtained.

It is considered that a communication algorithm having a high increasing rate of the communication speed around the intermediate message length is saturated before a message length reaches the long message length, and that a measurement result indicating a high communication speed fails to be obtained by using the long message length.

On the other hand, it is considered that a communication algorithm having a low increasing rate of the communication speed around the intermediate message length increases an increasing rate near the long message length, and that a communication speed increases at the long message length.

According to the measurement procedures determined in (2), the communication speed measurement unit 14A measures communication speeds according to respective communication algorithms. Accordingly, the communication speed measurement unit 14A performs measurement in order from a communication algorithm having the lowest increasing rate of the communication speed around the intermediate message length.

The control unit 13 may determine a communication algorithm having the lowest communication speed around the intermediate message length to be a communication algorithm having the highest communication speed for the long message length. In this case, the communication speed measurement unit 14A does not perform measurement on the remaining communication algorithms, and therefore a measurement time can be reduced.

The control unit 13 may measure communication speeds only according to a prescribed number of communication algorithms from a communication algorithm having the lowest increasing rate of the communication speed around the intermediate message length, and may refrain from measuring the communication speeds according to the remaining communication algorithms.

In this case, the number of measurement samples of communication algorithms for the long message length increases, and therefore a communication algorithm having the highest communication speed for the long message length can be detected with a high precision. In addition, in this case, measurement is not performed on all of the communication algorithms, and therefore the measurement time is reduced.

Figure 5:
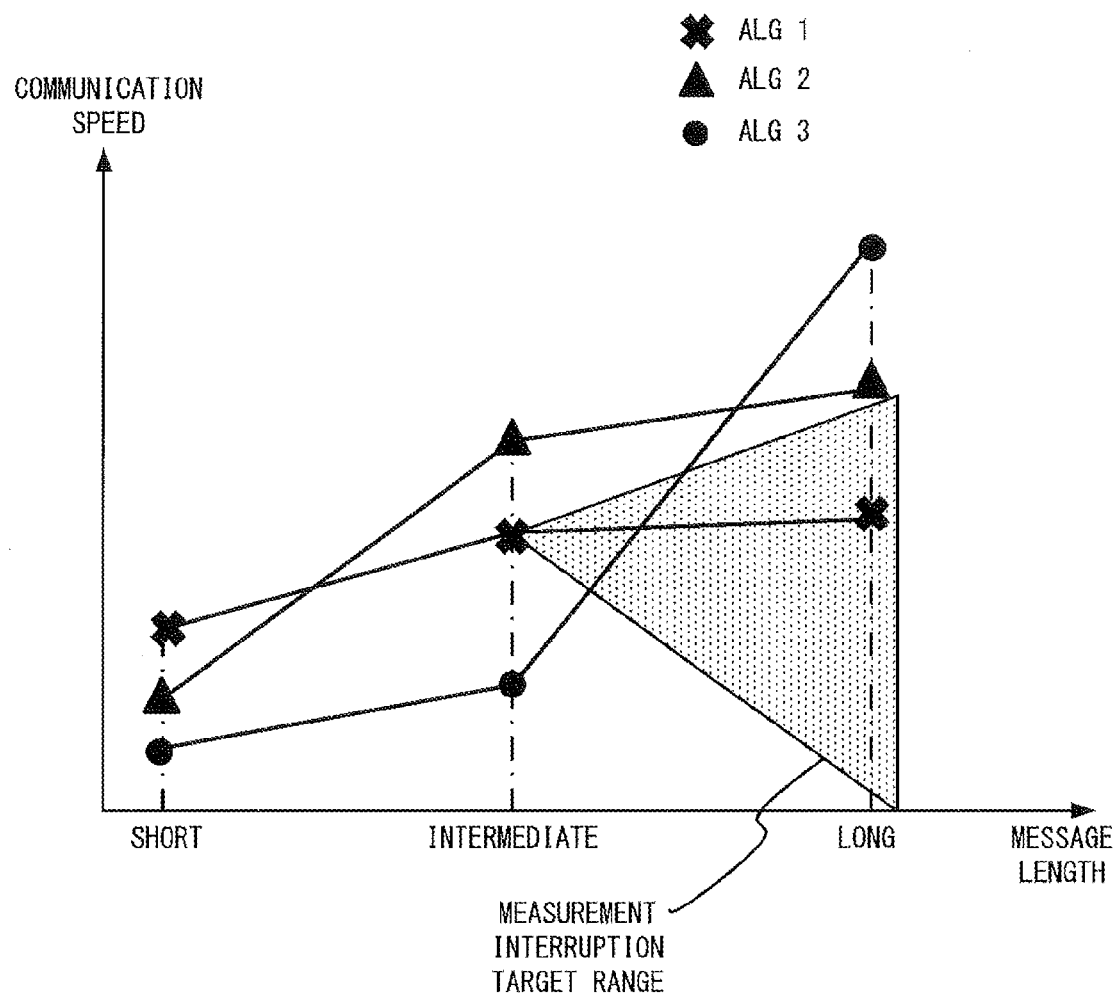
FIG. 5 is a graph (no. 3) illustrating an example of communication algorithm determination.

In the example of FIG. 5, a communication algorithm having the highest communication speed for the intermediate message length is ALG2. A communication algorithm having the lowest increasing rate of the communication speed for a message length around the intermediate message length is ALG2, and a communication algorithm having the highest increasing rate of the communication speed for a message length around the intermediate message length is ALG3.

Accordingly, the procedure determination unit 14B determines a procedure according to the basis of determination in (1) and (2) above of the measurement procedure in such a way that communication speeds are measured in a procedure of the communication algorithms ALG3, ALG2, and ALG1.

In the example of FIG. 5, a shaded area indicates a range in which measurement is interrupted (a measurement interruption target range).

<Example of Table Indicating Communication Algorithms According to Message Lengths>

An example of a table indicating communication algorithms according to message lengths is described next with reference to the example of FIG. 6. This table is generated by the algorithm determination unit 16 of the master node.

The generated table is stored in the storage 4 via the second network 7 by the master node. The generated table may be stored by the respective computing nodes 2, control nodes 3, or the like.

The table in the example of FIG. 6 includes items of the number of nodes, a message length, and a communication algorithm. The number of nodes indicates the number of computing nodes 2 that participate in group communication. In the example of FIG. 6, the number of nodes is a fixed number (128). In the embodiments, the number of nodes is specified by the terminal 5. The processing above is performed under a condition in which the number of nodes is fixed.

When the terminal 5 specifies the number of nodes that is different from the above number of nodes, the specified number of the computing nodes 2 perform the processing above again, and determine an appropriate communication algorithm according to a message length.

The item "message length" indicates the message lengths above. In the example of FIG. 6, assume that the short message length is 4 bytes, that the intermediate message length is 1024 bytes, and that the long message length is 4096 bytes.

The item "communication algorithm" indicates the name of a communication algorithm according to a message length. The table above may be stored as a setting file, for example, in the storage 4. When the respective computing nodes 2 in the parallel computer system 1 perform an actual operation, not a communication test, the respective computing nodes 2 reference the table in the example of FIG. 6, and determine a communication algorithm according to a message length.

As an example, when a message length in group communication is smaller than or equal to 1024 bytes, the respective computing nodes 2 perform group communication by using the communication algorithm "Ring". When the message length in group communication exceeds 1024 bytes, the respective computing nodes 2 perform group communication by using the communication algorithm "Basic linear".

Accordingly, when the respective computing nodes 2 in the parallel computer system 1 perform prescribed processing by using group communication, the respective computing nodes 2 reference the table, and can perform group communication by using an appropriate communication algorithm according to a message length.

<Determination of Communication Algorithm at New Measurement Point>

As described above, the algorithm determination unit 16 determines the highest-speed communication algorithm for each of the three message lengths. Therefore, an appropriate communication algorithm according to a message length is determined early.

The computing nodes 2 may measure a communication speed according to each of the communication algorithms for a larger number of message lengths so as to determine an appropriate communication algorithm. Consequently, an appropriate communication algorithm can be determined more precisely. A new measurement point is obtained on the basis of the already measured communication speeds according to the respective communication algorithms for the respective message lengths.

Determination of a new measurement point is described with reference to the example of FIG. 7. The control unit 13 reads, from the storing unit 15, a communication speed according to the highest-speed communication algorithm for the short message length and a communication speed according to the highest-speed communication algorithm for the intermediate message length.

The control unit 13 generates line segments between communication speeds according to the highest-speed communication algorithm for the short message length and between communication speeds according to the highest-speed communication algorithm for the intermediate message length. The generated line segments may intersect with each other. A point at which the line segments intersect with each other is a point at which the highest-speed communication algorithm is changed.

As an example, in the example of FIG. 7, a line segment indicating the communication algorithm ALG1 and a line segment indicating the communication algorithm ALG2 intersect with each other. The highest-speed communication algorithm is changed at a point at which the line segments intersect with each other. The control unit 13 specifies the point at which the line segments intersect with each other to be a new measurement point, and controls the communication speed measurement unit 14A to measure communication speeds according to the respective communication algorithms for a message length at the measurement point.

The control unit 13 generates the line segments above between the intermediate message length and the long message length. However, measurement of a communication speed according to the communication algorithm ALG1 for the long message length is interrupted, as described above. A line segment indicating the communication algorithm ALG1 for which measurement has been interrupted is not generated between the intermediate message length and the long message length.

In the example of FIG. 7, a line segment indicating the communication algorithm ALG2 and a line segment indicating the communication algorithm ALG3 intersect with each other between the intermediate message length and the long message length. In addition, a communication algorithm having a communication speed higher than the communication speed at an intersection of the line segments does not exit. Accordingly, the control unit 13 sets a message length at the intersection of the line segments to be a new measurement point.

The communication speed measurement unit 14A measures communication speeds according to the respective communication algorithms for a message length at the intersection of the line segments under the control of the control unit 13.

Figure 8:
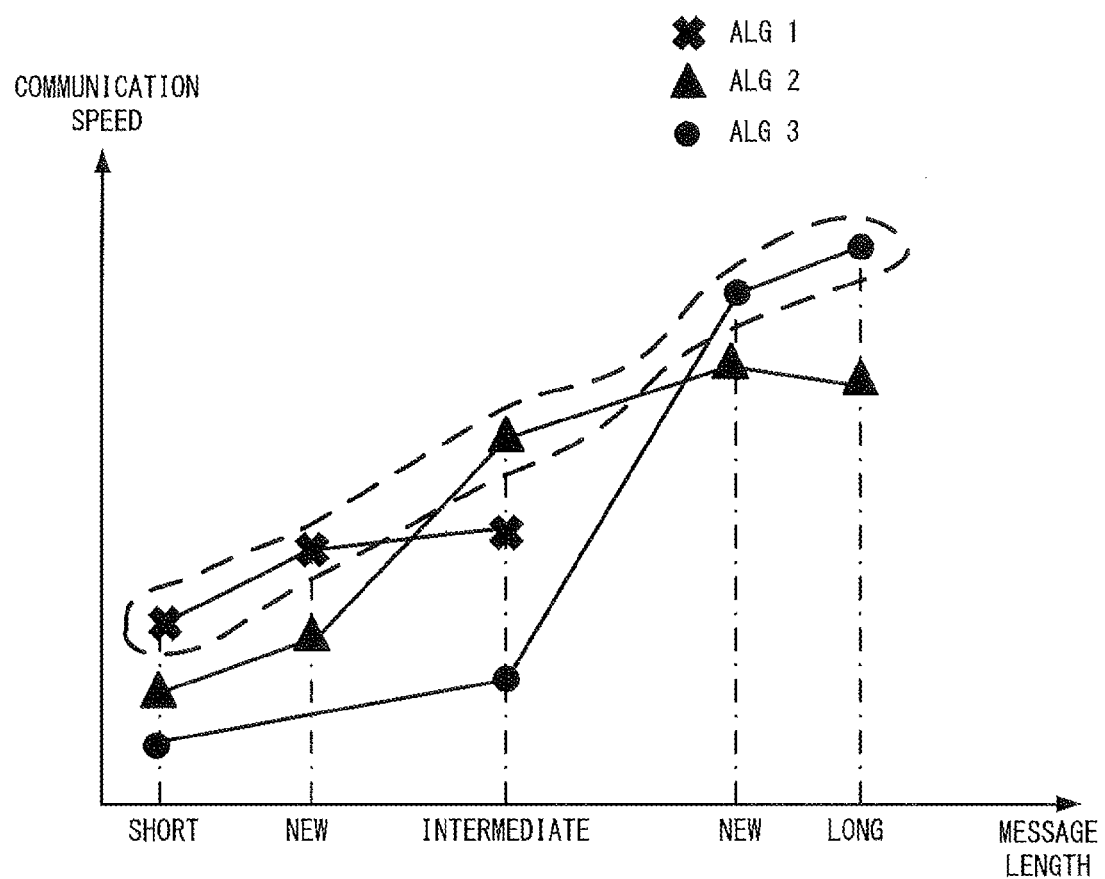
FIG. 8 is a graph (no. 5) illustrating an example of communication algorithm determination.

FIG. 8 illustrates measurement results according to the respective communication algorithms for message lengths at two newly set measurement points. The highest-speed communication algorithm at a measurement point that has been newly set between the short message length and the intermediate message length is ALG1. The highest-speed communication algorithm at a measurement point that has been newly set between the intermediate message length and the long message length is ALG3.

As a result, the highest-speed communication algorithms are determined for five message lengths different from each other. Accordingly, an appropriate communication algorithm is determined more precisely by determining communication algorithms on the basis of five message lengths than by determining communication algorithms on the basis of three message lengths.

The control unit 13 can binary-search-increase the number of measurement points by repeatedly performing similar processing on two adjacent measurement points, and can determine an appropriate communication algorithm more precisely.

When line segments do not intersect with each other between two adjacent measurement points, the control unit 13 may specify an intermediate point of the two measurement points to be a new measurement point. By doing this, the number of measurement points can be increased, and an appropriate communication algorithm according to a message length can be determined more precisely.

<Examples of Flowcharts Illustrating Flow of Processing According to Embodiments>

A flow of processing according to the embodiments is described next with reference to the examples of flowcharts illustrated in FIGS. 9 to 12. The terminal 5 receives an input of three message lengths, a short message length, an intermediate message length, and a long message length, in accordance with an operation performed via the terminal 5.

The terminal 5 transmits information relating to the three message lengths for which the input has been received to the job control node 3 via the third network 8. The job control node 3 transmits the information relating to the three message lengths to the respective computing nodes 2.

The respective computing nodes 2 receive the information relating to the three message lengths (step S1). The master node of the respective computing nodes 2 performs test communication according to the respective communication algorithms by using the short message length.

At this time, the master node reports, to respective worker nodes, information specifying a communication algorithm that is a target for test communication. The communication unit 12 performs group communication (test communication) according to the communication algorithm. The communication speed measurement unit 14A measures a communication speed in the test communication.

The communication speed measurement unit 14A measures communication speeds in the test communication according to the respective communication algorithms by using the short message length (step S2). Every time a communication algorithm that is a target for test communication is changed, the master node reports, to the respective worker nodes, information indicating which communication algorithm is a test target.

Measurement results according to the respective communication algorithms for the short message length that have been measured by the communication speed measurement unit 14A are stored in the storing unit 15.

The master node then performs test communication according to the respective communication algorithms by using the intermediate message length (step S3). Every time a communication algorithm that is a test target is changed, the master node reports, to the respective worker nodes, information indicating which communication algorithm is a test target.

Measurement results according to the respective communication algorithms for the intermediate message length that have been measured by the communication speed measurement unit 14A are stored in the storing unit 15.

The control unit 13 specifies the highest-speed communication algorithm on the basis of the measurement results according to the respective communication algorithms for the intermediate message length that have been stored in the storing unit 15 (step S4). The control unit 13 stores the specified communication algorithm as a variable in the storing unit 15.

The control unit 13 lists communication algorithms other than the communication algorithm specified in step S4 from among the respective communication algorithms for the intermediate message length (step S5). The control unit 13 stores the listed communication algorithms in the storing unit 15.

The control unit 13 controls the communication unit 12 to perform test communication by using the long message length according to the communication algorithm specified in step S4 (the highest-speed communication algorithm for the intermediate message length).

The communication speed measurement unit 14A measures a communication speed in the test communication (step S6). The control unit 13 stores, in the storing unit 15, the time that the communication speed measurement unit 14A needs to perform the test communication as a time threshold Tth (step S7).

The control unit 13 obtains increasing rates of a communication speed around the intermediate message length according to the respective communication algorithms listed in step S5 (step S8). In the embodiments, the increasing rate is indicated by an inclination formed by a communication speed for the short message length and a communication speed for the intermediate message length according to each of the communication algorithms.

The control unit 13 rearranges the respective communication algorithms included in the list stored in the storing unit 15 in the ascending order of the detected increasing rate of a communication speed according to each of the communication algorithms (step S9).

Stated another way, the control unit 13 rearranges the respective communication algorithms in the ascending order of the increasing rate (the inclination) of the communication speed. The control unit 13 stores, in the storing unit 15, a list obtained by performing rearrangement in step S9. The processing moves on to "A".

Processing after A is described with reference to the example of FIG. 10. The control unit 13 extracts a communication algorithm from the list stored in the storing unit 15 (step S10). Respective communication algorithms included in the list have been rearranged. The control unit 13 extracts a communication algorithm according to the order obtained by performing rearrangement in step S9.

The control unit 13 controls the communication unit 12 to perform test communication according to the extracted communication algorithm by using the long message length. The communication speed measurement unit 14A measures a communication speed (step S11).

The control unit 13 monitors whether test communication has been finished (step S12). When test communication has not been finished (NO in step S12), the control unit 13 determines whether a measurement time in test communication exceeds a time threshold Tth (step S13).

When the measurement time does not exceed the time threshold Tth (NO in step S13), the processing returns to step S12, and the control unit 13 continues to monitor whether test communication has been finished (step S12).

When the measurement time in test communication exceeds the time threshold Tth (YES in step S13), the control unit 13 performs control to interrupt test communication at a point in time at which the measurement time exceeds the time threshold Tth, and terminates measurement according to the communication algorithm.

Consequently, measurement of a communication speed according to a communication algorithm that does not have the highest speed is interrupted, and therefore the time needed to determine an appropriate communication algorithm according to a message length can be reduced.

When test communication is finished before the measurement time reaches the time threshold Tth (YES in step S12), the control unit 13 updates the time threshold Tth to a current measurement time (step S14). In this case, the highest-speed communication algorithm for the long message length is updated.

A communication algorithm that needs a measurement time that is longer than the updated time threshold Tth is not the highest-speed communication algorithm for the long message length. Accordingly, the control unit 13 interrupts measurement of a communication speed according to the communication algorithm by using the updated time threshold Tth as a reference such that the time needed to determine an appropriate communication algorithm according to a message length can be reduced.

The control unit 13 determines whether communication speeds according to all of the communication algorithms have been measured (step S15). When communication speeds have not been measured according to all of the communication algorithms (NO in step S15), the processing returns to step S10.

When communication speeds have been measured according to all of the communication algorithms (YES in step S15), the algorithm determination unit 16 determines a communication algorithm according to a message length (step S16).

Consequently, an appropriate communication algorithm according to a message length is determined. In the embodiments, the appropriate communication algorithm according to the message length is stored in the storage 4 in the form of a table.

An example of processing for determining a communication algorithm at a new measurement point is described next with reference to the flowchart of FIG. 11. The control unit 13 obtains measurement results at 2n+1 measurement points that have been stored in the storing unit 15 (step S21). Note that n is a natural number.

The obtained measurement results each include a message length and the highest-speed communication algorithm for the message length. The control unit 13 sets a variable i to zero (step S22). The variable i is an integer.

Assume that Msg(i) is an i-th message length, and that Msg(i+1) is an i+1-th message length. As an example, when there are three message lengths, Msg(0) is the short message length, Msg(1) is the intermediate message length, and Msg(2) is the long message length.

The control unit 13 determines whether the highest-speed communication algorithm for Msg(i) is the same as the highest-speed communication algorithm for Msg(i+1) (step S23). Assume that the highest-speed communication algorithm for Msg(i) is A(i), and that the highest-speed communication algorithm for Msg(i+1) is A(i+1).

Accordingly, it is determined in step S23 whether the highest-speed communication algorithms A(i) and A(i+1) for adjacent message lengths are the same to each other.

When the communication algorithms A(i) and A(i+1) are not the same to each other (NO in step S24), the control unit 13 generates line segments for the communication algorithms A(i) and A(i+1) that connect communication speeds for Msg(i) and Msg(i+1) (step S25).

When the determination result in step S24 is NO, an intersection of the line segments above exists. The control unit 13 detects the intersection of the line segments, and newly sets a message length at the intersection as Msg (xi) (step S26).

When the communication algorithms A(i) and A(i+1) are the same to each other (YES in step S24), an intersection of line segments does not exit even when the line segments above are generated.

In this case, the control unit 13 newly sets a message length Msg(xi) between Msg(i) and Msg(i+1) (step S27). As an example, the control unit 13 may set the message length Msg (xi) according to the following expression.

$$Msg(xi) = 2^{((\log_2 Msg(i) + \log_2 Msg(i+1)/2))}$$

The control unit 13 performs control to measure communication speeds according to all of the communication algorithms by using the message length Msg(xi) in an order in which one of the communication algorithms A(i) and A(i+1) is prioritized.

Under this control, the communication unit 12 performs test communication according to the respective communication algorithms by using the message length Msg(xi), and the communication speed measurement unit 14A measures speeds in test communication (step S28). Measurement results are stored in the storing unit 15.

When the variable i is zero, the message length Msg(xi) is set between the short message length and the intermediate message length. The control unit 13 increments the variable i (step S29). Because the variable i is zero, a value of the variable i is incremented to 1.

The control unit 13 determines whether a value of the variable i reaches 2n (step S30). When n=1 is established (when there are three message lengths), the variable i has not reached 2n. In this case (NO in step S30), the processing returns to step S23.

When the variable i is 1, the message length Msg(xi) is newly set between the intermediate message length and the long message length. Communication speeds for the message length Msg(xi) according to the respective communication algorithms are measured.

As a result of the processing above, communication speeds for two new message lengths according to the respective communication algorithms are measured. The algorithm determination unit 16 determines a communication algorithm having the highest communication speed of the communication speeds for all five message lengths according to the respective communication algorithms (step S31).

Accordingly, the number of measurement points of a communication speed can be increased by 2, and an appropriate communication algorithm can be determined more precisely.

As a result of the processing above, the highest-speed communication algorithms for all five message lengths are determined. The computing nodes 2 set n in step S21 to 2, and perform the processing illustrated in FIG. 11 such that the highest-speed communication algorithms for all nine message lengths can be determined.

Figure 9:
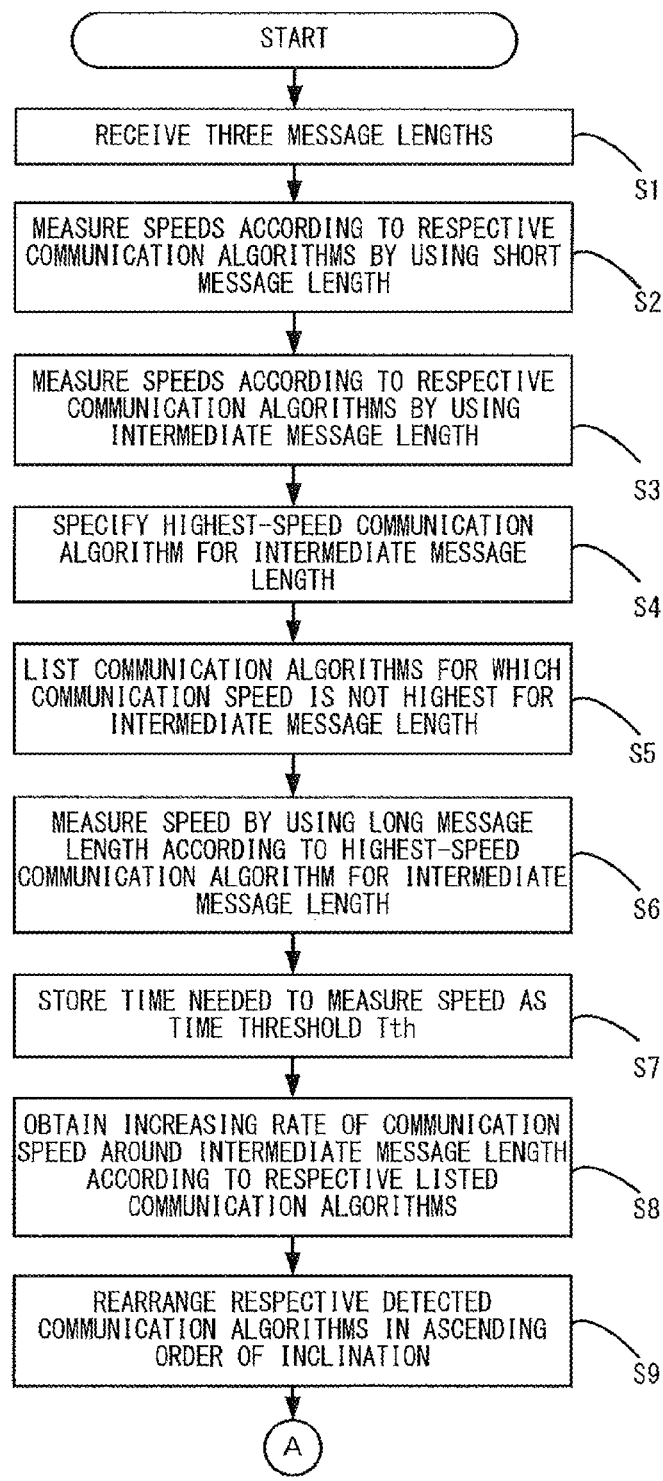
FIG. 9 is a flowchart (no. 1) illustrating an example of processing according to the embodiments.
Figure 10:
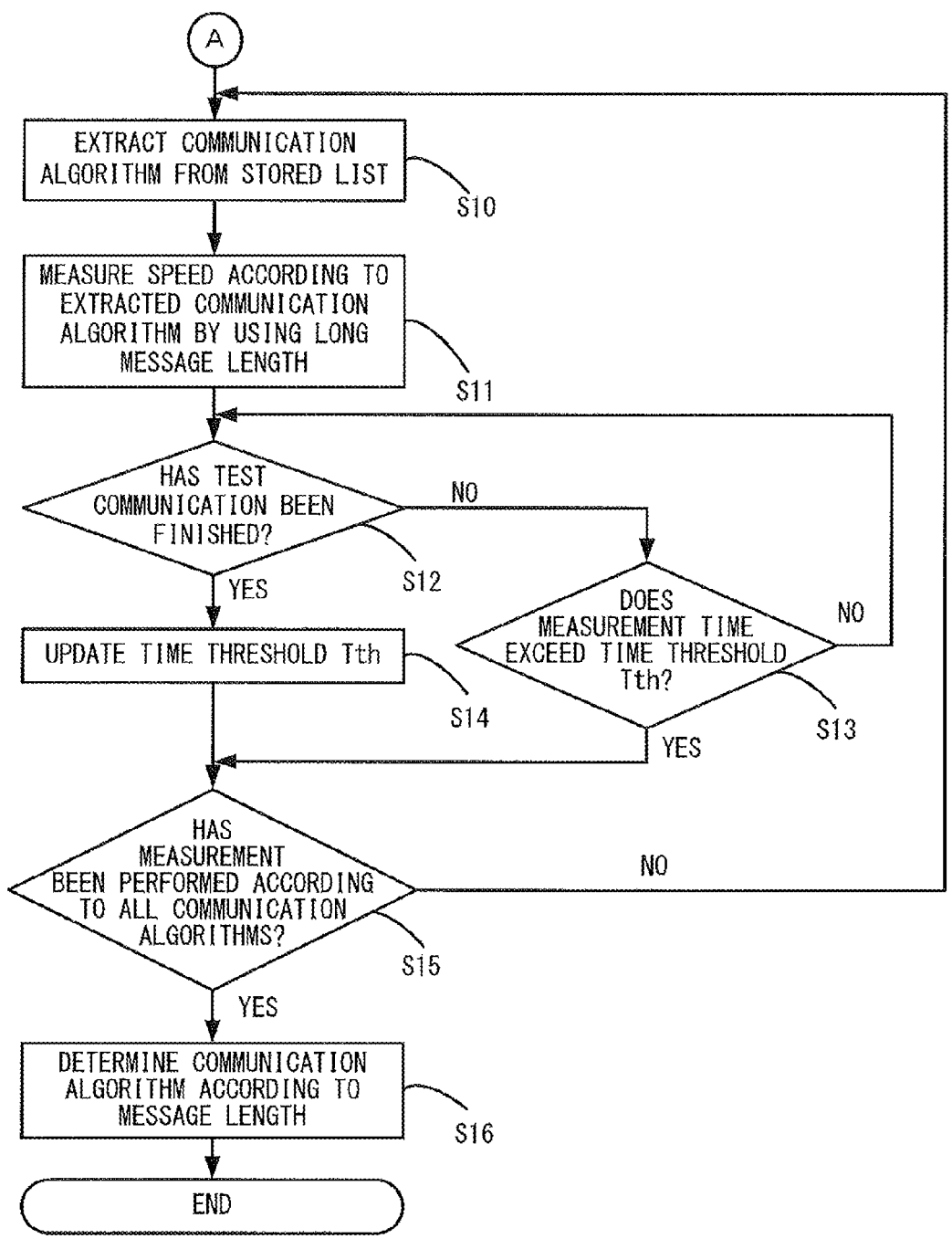
FIG. 10 is a flowchart (no. 2) illustrating an example of processing according to the embodiments.

Respective processes in the flowcharts of FIGS. 9 to 11 are performed under a condition in which the number of computing nodes that participate in group communication is fixed. The control unit 13 may change the number of computing nodes 2 (the number of nodes), and may determine a communication algorithm according to a message length.

When the number of nodes that participate in group communication changes, the highest-speed communication algorithms for respective message lengths may change. Accordingly, the number of nodes is changed, and a communication algorithm according to a message length is determined such that an appropriate communication algorithm according to the number of nodes and a message length is determined.

<Example of Hardware Configuration of Computing Node>

An example of a hardware configuration of the computing node 2 is described next with reference to the example of FIG. 12. As illustrated in the example of FIG. 12, a processor 111, a Random Access Memory (RAM) 112, a Read Only Memory (ROM) 113, an auxiliary storage 114, a medium connecting unit 115, and a communication interface 116 are connected to a bus 100.

The processor 111 is an arbitrary processing circuit. The CPU described above may be employed, for example, as the processor 111.

The processor 111 executes a program deployed onto the RAM 112 (a main storage). As the executed program, a program for performing the processing according to the embodiments may be employed. The ROM 113 is a non-volatile storage that stores the program deployed onto the RAM 112.

The auxiliary storage 114 is a storage that stores various types of information, and a hard disk drive, a semiconductor memory, or the like may be employed, for example, as the auxiliary storage 114. The medium connecting unit 115 is provided so as to be able to be connected to a removable recording medium 119.

As the removable recording medium 119, a removable memory or an optical disk (for example, a Compact Disc (CD), a Digital Versatile Disc (DVD), or the like) may be employed. A program for performing the processing according to the embodiments may be recorded in the removable recording medium 119.

In the computing node 2, the communication unit 12 may be implemented by the communication interface 116. The storing unit 15 may be implemented by the RAM 112 or the auxiliary storage 114. In the computing node 2, respective units other than the communication unit 12 and the storing unit 15 may be implemented by the processor 111 executing a given program.

All of the RAM 112, the ROM 113, the auxiliary storage 114, and the removable recording medium 119 are examples of a computer-readable non-transitory recording medium. These non-transitory storage media are not transitory media such as a signal carrier.

<Others>

According to the embodiments, the time needed to determine an appropriate communication algorithm according to a message length can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A non-transitory computer-readable recording medium having stored therein a communication algorithm determination program performed by a processor that causes a node in a parallel computer system to execute a process comprising:

performing first communication having a message length within a specific range according to communication algorithms different from each other, and measuring communication speeds according to the respective communication algorithms;

determining a procedure of the communication algorithms in performing second communication based on the measured communication speeds, the second communication having a message length within a range of the message length that is longer than the message length of the first communication, performing the second communication according to the determined procedure, and measuring the communication speeds according to the respective communication algorithms;

determining the communication algorithm according to the message length based on measurement results in the first communication and the measurement results in the second communication; and interrupting measurement in the second communication when the measurement time in the second communication exceeds a threshold, the threshold being a measurement time in the second communication according to the communication algorithm for which the measurement result in the first communication is the highest.

2. The non-transitory computer-readable recording medium according to claim 1, the process further comprising:

determining the procedure in the second communication in such a way that the communication speed according to a highest-speed communication algorithm from among the measurement results of the first communication is first measured.

3. The non-transitory computer-readable recording medium according to claim 1, the process further comprising:

performing the first communication by using message lengths different from each other within the specific range, and measuring respective communication speeds; and determining the procedure in the second communication based on an increasing rate of the communication speed within the specific range, the increasing rate being obtained from the respective measured communication speeds.

4. The non-transitory computer-readable recording medium according to claim 3, the process further comprising:

determining the procedure in the second communication in such a way that the communication speed is measured sequentially from the communication algorithm having a low increasing rate of the communication speed.

5. The non-transitory computer-readable recording medium according to claim 1, the process further comprising:

detecting, when the highest-speed communication algorithm from among the measurement results in the first communication is different from the highest-speed communication algorithm from among the measurement results in the second communication, a point at which the highest-speed communication algorithm is changed between the message length in the first communication and the message length in the second communication; and measuring the communication speeds according to the respective communication algorithms at the detected point.

6. The non-transitory computer-readable recording medium according to claim 1, the process further comprising:

setting, when the highest-speed communication algorithm from among the measurement results in the first communication is the same as the highest-speed communication algorithm from among the measurement results in the second communication, a point between the message length of the first communication and the message length of the second communication; and measuring the communication speeds according to the respective communication algorithms at the specified point.

7. A communication algorithm determination method conducted by a node in a parallel computer system, the communication algorithm determination method comprising:

performing first communication having a message length within a specific range according to communication algorithms different from each other, and measuring communication speeds according to the respective communication algorithms;

determining a procedure of the communication algorithms in performing second communication based on the measured communication speeds, the second communication having a message length within a range of the message length that is longer than the message length of the first communication, performing the second communication according to the determined procedure, and measuring the communication speeds according to the respective communication algorithms;

determining the communication algorithm according to the message length based on measurement results in the first communication and the measurement results in the second communication; and interrupting measurement in the second communication when the measurement time in the second communication exceeds a threshold, the threshold being a measurement time in the second communication according to the communication algorithm for which the measurement result in the first communication is the highest.

8. An information processing device in a parallel computer system, the information processing device comprising:

a processor configured to execute a process including:

performing first communication having a message length within a specific range according to communication algorithms different from each other, and measuring communication speeds according to the respective communication algorithms;

determining a procedure of the communication algorithms in performing second communication based on the measured communication speeds, the second communication having a message length within a range of the message length that is longer than the message length of the first communication, performing the second communication according to the determined procedure, and measuring the communication speeds according to the respective communication algorithms;

determining the communication algorithm according to the message length based on measurement results in the first communication and the measurement results in the second communication; and interrupting measurement in the second communication when the measurement time in the second communication exceeds a threshold, the threshold being a measurement time in the second communication according to the communication algorithm for which the measurement result in the first communication is the highest.

\* \* \* \* \*